(No Model.)
W. H. CAMPBELL.
RECEIPT FORM AND STRIPPER THEREFOR.
No. 490,897. Patented Jan. 31, 1893.
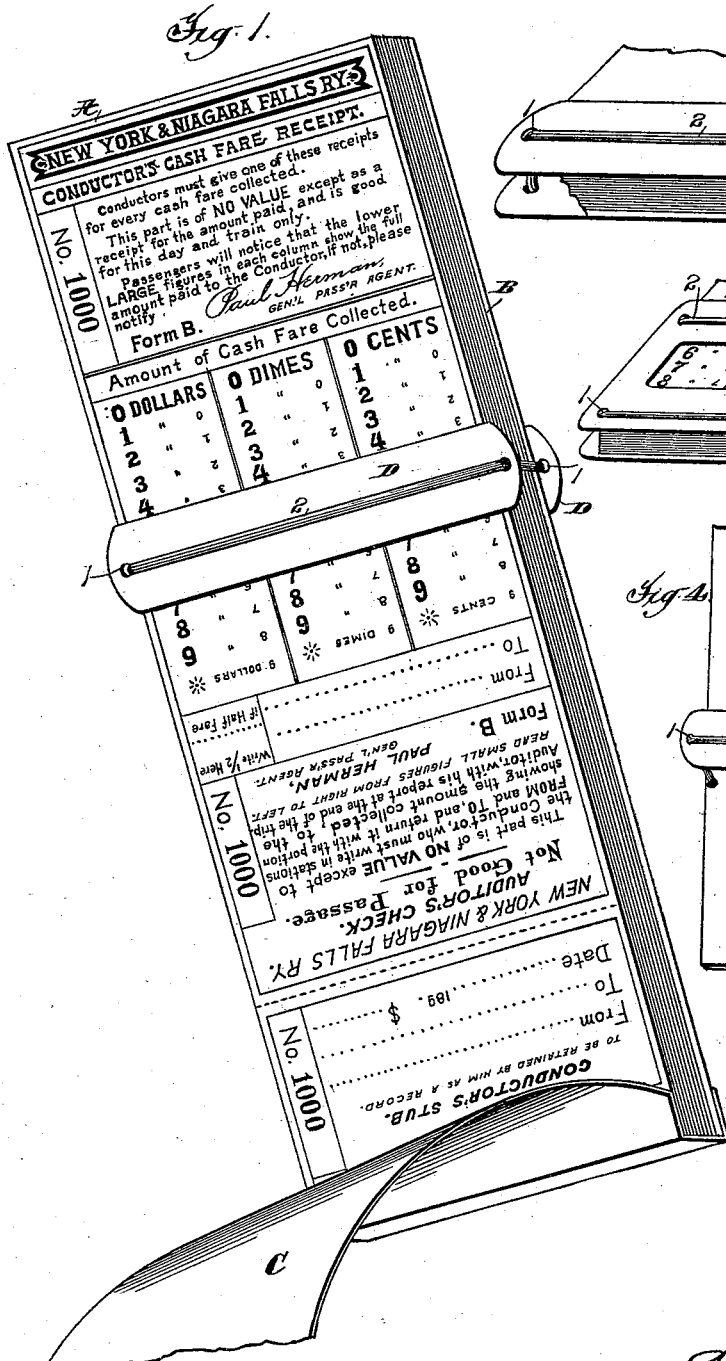
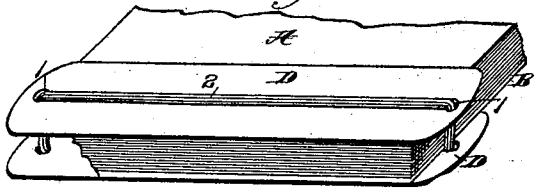
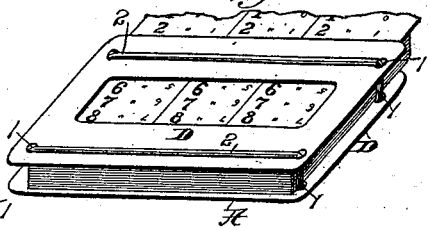
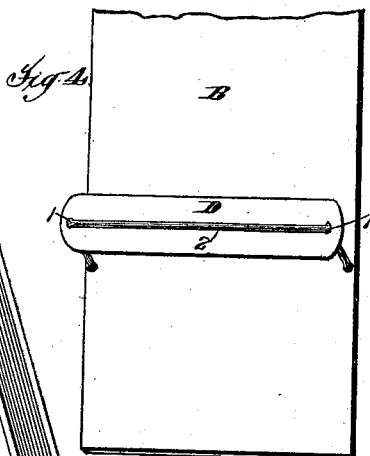
Attest:
Thos. F. Kehoe
G. M. Borst
Inventor:
William H. Campbell
by
Philipp Munson & Phelps
Attys

UNITED STATES PATENT OFFICE.

WILLIAM H. CAMPBELL, OF NEW YORK, N. Y.

RECEIPT-FORM AND STRIPPER THEREFOR.

SPECIFICATION forming part of Letters Patent No. 490,897, dated January 31, 1893.

Application filed May 31, 1892. Serial No. 434,941. (No model.)

*To all whom it may concern:*

Be it known that I, WILLIAM H. CAMPBELL, a citizen of the United States, residing at New York, in the county of New York and State of New York, have invented certain new and useful Improvements in Receipt-Forms and Strippers Therefor, fully described and represented in the following specification and the accompanying drawings, forming a part of the same.

The object of my invention is to provide a cheap, simple and convenient ticket or receipt form for use in books or pads, which will enable the user to quickly and conveniently make out a check or receipt for the amount received and a record or check in convenient form showing the amount paid, and to provide an improved construction of ticket or receipt pad and stripper therefor.

My invention is specially applicable to that class of conductors' cash fare receipts given passengers for fares paid on the train, which are made out by detaching a portion of the form leaving an auditor's check which also shows the amount of the fare, but it will be understood that the invention is applicable also to parlor and sleeping car service, mileage, baggage, commutation and other tickets, and generally for any kind of receipt, or ticket made out from prepared forms by detaching portions, leaving a check or record on the form.

In connection with my improved check and receipt form I have provided also an improved construction of ticket or receipt pad, and stripper or straight edge therefor, which latter may be readily and conveniently shifted on the pad and which forms also an interchangeable and self-adjustable ticket or receipt holder.

For a full understanding of my invention a detailed description of the same will now be given in connection with the accompanying drawings forming a part of this specification, in which I have illustrated my improved form as applied to conductors' cash fare receipts, and my improved stripper as applied to the same and as a ticket holder and stripper for mileage or commutation tickets.

Figure 1 is a perspective view of a conductor's cash fare receipt book or pad. Fig. 2 is a broken perspective showing both ends of the stripper. Fig. 3 shows my improved stripper and ticket holder as applied to a mileage or commutation ticket. Fig. 4 shows a modification of the construction of Fig. 1.

Referring to said drawings:—The cash fare book or pad consists of a series of forms A provided preferably with a comparatively stiff backing B and a cover C of any suitable construction. The forms are printed in reverse directions from opposite ends, the part at one end forming the cash fare receipt and that at the other end the conductor's stub and auditor's check. Between the printed matter of the receipt and check, a portion of the form is printed in a double series of characters representing sums of money, the double series being printed in opposite directions as in the case of the receipt and check, and the amounts in one column being arranged one figure or division below the other, so that as the ticket is severed on a line between successive figures or divisions to form the receipt, the opposite ends of the form will show the same sums and read right side up. Any suitable divisions may be used such as dollars, halves, quarters, cents, &c., but I provide a ticket in compact form, reducing largely the size of ticket and amount of paper and printing required, while giving a wide and complete range of amounts, by using three columns of digits arranged as dollars, dimes and cents, so that any amount from one cent up to ten dollars may be receipted for, and it is evident that the amount may be carried higher by lengthening the dollar column or adding other columns of digits. The duplicate columns are preferably printed in different sizes so as to be distinguished as shown, and different colors may be used, if desired. The form is preferably slit between the columns so as to enable the two ends of the ticket to be separated readily by tearing the parts of the form cross-wise between the slits, so as to show the desired amount, but it will be understood that perforations or any similar means may be used for this purpose. The drawback system or other desired features in common use may readily be applied to my form.

In combination with my improved form any suitable stripper or straight edge may be used, but I prefer to use a stripper of the construction shown, and such a combination forms a part of my invention. This stripper consists in the preferred form shown in Fig. 1, of two strips of a length slightly in excess of the width of the form book or pad, which strips are perforated at their ends as shown at 1 and secured together by a rubber cord or band 2 passed through the perforations. The strips D may be of any suitable material such as metal, wood, cardboard, or any other hard, slightly flexible material sufficiently rigid and firm to afford stripping on straight edge surfaces, against which the tickets may be torn on the lines desired.

It will be seen that the stripper is self-adjustable as the successive forms are removed and that it will hold tightly either one or any limited number of forms and that it serves also as a holder for the forms which are thus held closely and compactly against the back B. The stripper is used by sliding it to the desired amount and tearing the ticket against the edge of the stripper on the line desired, the stripper sliding freely on the book or pad. When the book is exhausted the stripper is removed and may be applied to another book, remaining in use until worn out.

In Fig. 4 I have shown a modification of the form book and stripper, in which but one independent strip D is used, the rubber cord or band 2 being passed through openings in the back B, so that the latter forms one of the strips of the stripper, the strip D forming the straight edge in this case being moved along the book or pad by stretching the rubber, and the strip returning to position when released.

The manner of using the ticket will be understood by those skilled in the art by a brief description:—

Assuming that a cash fare of four dollars and eighty-five cents has been paid, the first or dollar column is torn against the edge of the stripper on the line shown in Fig. 1. The stripper is then moved below the large figure 8 and the dime column similarly severed between the figures 8 and 9. The stripper is then moved back and the cents column torn between the figures 5 and 6. It will be seen that the receipt and check parts of the ticket then show the amount $4.85 respectively in the large and small numerals, with the figures reading right side up on both parts conveniently for reference.

It is evident that the stripper and holder may be made of any desired width, and that two or more elastic bands 2 may be used if desired. Thus in Fig. 3 I have shown a construction in which the stripper is made with two bands, and it will be understood that this number may be increased if desired, the combined holder and stripper accommodating itself, as previously described, to all thicknesses of the pad and being interchangeable so as to be applied to other pads when one is used up.

What I claim is:—

1. A receipt form comprising a receipt and check printed reversely from opposite ends, and provided between the receipt and check portions with duplicate reversely printed columns of characters representing sums of money, the characters in one of the duplicate columns being arranged one step below those of the corresponding column, substantially as described.

2. A receipt form comprising a receipt and check printed reversely from opposite ends, and provided between the receipt and check portions with duplicate reversely printed columns of digits representing dollars, dimes and cents, the digits in each one of the duplicate columns being arranged one step below those of the corresponding column, substantially as described.

3. The combination with a pad or book of forms comprising a receipt and check printed reversely from opposite ends and provided between the receipt and check portions with duplicate columns of characters representing sums of money, the characters in one column being arranged one step below those of the corresponding column, of a stripper on said book consisting of strips secured together by an elastic band or bands and inclosing the forms, substantially as described.

4. The combination with a pad or book of forms comprising a receipt and check printed reversely from opposite ends and provided between the receipt and check portions with duplicate columns of characters representing sums of money, the characters in one column being arranged one step below those of the corresponding column, of a stripper on said book consisting of two strips D both movable on the book and secured together to inclose the forms by elastic band or bands 2, substantially as described.

In testimony whereof I have hereunto set my hand in the presence of two subscribing witnesses.

WM. H. CAMPBELL.

Witnesses:
PAUL HERMANN,
JOHN DIEL.